(12) United States Patent  
Sheriff et al.

(10) Patent No.: US 8,554,421 B2
(45) Date of Patent: Oct. 8, 2013

(54) DYNAMICS CONTROL

(75) Inventors: Antony Sheriff, London (GB); Mark Vinnels, Finchampstead (GB); Richard Felton, Knaphill (GB)

(73) Assignee: McLaren Automotive Limited, Woking, Surrey (GB)

( * ) Notice: Subject to any disclaimer, the term of this patent is extended or adjusted under 35 U.S.C. 154(b) by 0 days.

(21) Appl. No.: 13/395,089

(22) PCT Filed: Sep. 8, 2010

(86) PCT No.: PCT/EP2010/063164
§ 371 (c)(1),
(2), (4) Date: Mar. 29, 2012

(87) PCT Pub. No.: WO2011/029839
PCT Pub. Date: Mar. 17, 2011

(65) Prior Publication Data
US 2012/0185135 A1 Jul. 19, 2012

(30) Foreign Application Priority Data

Sep. 8, 2009 (GB) .................................. 0915700.9

(51) Int. Cl.
*G06F 19/00* (2011.01)
(52) U.S. Cl.
USPC ............... 701/48; 701/19; 345/418; 345/419; 345/473; 345/474; 345/501; 700/38; 700/39; 700/40; 700/43; 706/45; 706/62; 307/9.1; 307/10.1; 708/446; 712/2; 712/7; 318/561
(58) Field of Classification Search
USPC ...................... 701/19, 48; 345/418, 419, 473, 345/474, 501, 502, 503, 504, 505, 506, 530; 700/38, 39, 40, 43; 706/45, 62; 307/9.1, 307/10.1; 708/446; 712/2, 7; 703/6; 318/561; 246/182 R
See application file for complete search history.

(56) References Cited

U.S. PATENT DOCUMENTS 7,571,044 B2 * 8/2009 Brown et al. ................... 701/91
7,845,168 B2 * 12/2010 Pruitt et al. ...................... 60/431
(Continued)

FOREIGN PATENT DOCUMENTS

DE 102006059058 A1 6/2008
EP 2233388 A2 9/2010
(Continued)

OTHER PUBLICATIONS

Phillips et al., Vehicle System Controller Design for a Hybrid Electric Vehicle, 2000, IEEE, p. 297-302.*
(Continued)

*Primary Examiner* — McDieunel Marc
(74) *Attorney, Agent, or Firm* — Haynes Beffel & Wolfeld LLP

(57) ABSTRACT

A vehicle having a dynamics control system, the vehicle comprising: a first set comprising multiple adjustable subsystems that affect the performance of the vehicle's powertrain; a second set comprising multiple adjustable sub-systems that affect the vehicle's handling; a dynamics user interface including a first input device and a second input device; and a dynamics controller coupled to the user interface and configured to adjust the operation of the sub-systems of the first set in dependence on the first input device and to adjust the operation of the sub-systems of the second set in dependence on the second input device.

15 Claims, 2 Drawing Sheets

(56) References Cited

U.S. PATENT DOCUMENTS

| | | | |
|---|---|---|---|
| 7,937,205 B2 * | 5/2011 | Nettelmann et al. | 701/91 |
| 7,980,221 B2 * | 7/2011 | Baur et al. | 123/435 |
| 8,050,821 B2 * | 11/2011 | Morris et al. | 701/37 |
| 8,140,238 B2 * | 3/2012 | Luehrsen et al. | 701/82 |
| 8,280,612 B2 * | 10/2012 | Whitney et al. | 701/103 |
| 8,392,090 B2 * | 3/2013 | Okamura et al. | 701/93 |
| 2007/0163376 A1 | 7/2007 | Baldet | |
| 2007/0276549 A1 | 11/2007 | Hijikata | |

FOREIGN PATENT DOCUMENTS

| | | |
|---|---|---|
| WO | 2009066143 A2 | 5/2009 |
| WO | 2009153167 A1 | 12/2009 |

OTHER PUBLICATIONS

Search report mailed Dec. 17, 2010 in GB0915700.9, 3pp.
International Search Report mailed Mar. 22, 2011 in PCT/EP2010/063164, 9pp.

* cited by examiner

DYNAMICS CONTROL

This invention relates to the control of vehicles' dynamics.

A vehicle's handling dynamics are influenced by many factors, for example the responsiveness of the engine, the set-up of the suspension, and the vehicle's aerodynamics. For many vehicles, the factors that influence dynamics are set at the factory and cannot be altered by the driver unless he replaces some of the car's components. Sports and off-road vehicles are designed to be capable of offering extremes of dynamic performance, but those extreme dynamics are not always convenient. For example, a sports vehicle may be designed to strongly resist body roll and to be very responsive to the accelerator pedal; but these characteristics are less desirable in relaxed driving situations. In addition, the driver of a sports or off-road vehicle may want to adjust the vehicle's dynamics whilst in motion to best suit certain conditions. For example he might be driving on a track that benefits a vehicle with a high top speed, or alternatively on one that benefits a vehicle with high downforce. For these reasons, some sports and off-road vehicles are equipped with controls that allow the driver to alter the vehicle's dynamics whilst the car is being driven.

Such controls take a number of forms. One option when designing a vehicle's driver interface is to provide individual controls for each adjustable dynamic feature. For example, there could be individual controls for throttle response (insensitive, medium, sensitive), suspension stiffness (soft, medium, firm) and gearbox shift speed (slow, fast). This approach allows the driver to select whatever combination of settings he desires. However this approach means that the driver needs to make many separate settings to achieve some configurations, which takes a considerable time. Also, it results in a proliferation of controls, which can spoil the appearance of the vehicle's interior and make it seem over-complex to drive. Furthermore, for reasons of safety it is desirable for a car's controls to be as intuitive as possible. This objective is not met if there is a proliferation of dynamics controls.

One way to address these problems is to replace some or all of the individual controls with a single control that activates certain combinations of settings. In a sports car, for instance, the control could have positions for "winter", "town", "sport" and "track" driving. When the driver selects one of the positions the vehicle adopts a predefined combination of settings that are appropriate for the corresponding type of driving. The combinations of settings could be defined at the factory, or could be chosen and stored by the driver in advance. The problem with this approach—especially in a sports car—is that the pre-set options are too inflexible for many situations. For example, on a wet track the driver might want suspension that is resistant to roll (as with the "track" setting) but slower gear shifts (as with the "town" setting).

There is a need for a driver interface that provides an improved balance between flexibility and simplicity.

According to the present invention there is be provided a vehicle having a dynamics control system, the vehicle comprising: a first set comprising multiple adjustable sub-systems that affect the performance of the vehicle's powertrain; a second set comprising multiple adjustable sub-systems that affect the vehicle's handling; a dynamics user interface including a first input device and a second input device; and a dynamics controller coupled to the user interface and configured to adjust the operation of the sub-systems of the first set in dependence on the first input device and to adjust the operation of the sub-systems of the second set in dependence on the second input device.

The dynamics controller may be configured to adjust the operation of the sub-systems of the first set independently of the second input device. The dynamics controller may be able to adjust the operation of the sub-systems of the second set independently of the first input device.

The first input device may have two or more available states, or three or more available states. The dynamics controller may be configured to adjust the operation of the sub-systems of the first set in dependence on the state of the first input device.

The second input device may have two or more available states, or three or more available states. The dynamics controller may be configured to adjust the operation of the sub-systems of the second set in dependence on the state of the second input device.

The sub-systems of the first set may comprise two or more of:
  engine,
  gearbox,
  valving in exhaust.

The sub-systems of the second set may comprise two or more of:
  suspension,
  adjustable aerodynamic device,
  stability control system,
  traction control system,
  steering feedback system,
  brake system.

The dynamics user interface may comprise a third input device. The dynamics controller may be operable in a first mode in which it may be configured to adjust the operation of the sub-systems of the first set in dependence on the first input device and to adjust the operation of the sub-systems of the second set in dependence on the second input device. Alternatively, the dynamics controller may be operated in a second mode in which it may be configured to set the operation of the sub-systems of the first set independently of the first input device and to set the operation of the sub-systems of the second set independently of the second input device. The dynamics controller may be configured to operate in one of the first and the second modes in dependence on the third input device.

There may be a fourth input device to which a gearbox of the car is responsive to switch from manual mode to automatic mode. The gearbox may be further configured to operate only in automatic mode, irrespective of the fourth input device, when the dynamics controller is operating in the second mode.

There may be a fifth input device to which a variable aerodynamic element of the car is responsive to enable and disable functions of its variable operation. The variable aerodynamic element may be further configured such that those functions are disabled, irrespective of the fifth input device, when the dynamics controller is operating in the second mode.

The dynamics controller may be configured to operate by default in the second mode when the vehicle is started.

The dynamics controller may be configured to, in the second mode, set the sub-systems of the first set and the second set to operating characteristics that are adapted for casual/non-enthusiastic driving.

The dynamics user interface may comprise a sixth input device. The dynamics controller may be operable in a first mode in which it is configured to adjust the operation of the sub-systems of the first set in dependence on the first input device and to adjust the operation of the sub-systems of the second set in dependence on the second input device, and a third mode in which it is configured to set the sub-systems of the first set and the second set to operating characteristics that are adapted for winter driving.

The controller is preferably configured to adjust the operation of the sub-systems of the first set so as to alter the operational characteristics of the vehicle's powertrain. The controller is preferably configured to adjust the operation of the sub-systems of the second set so as to alter the vehicle's handling.

The present invention will now be described by way of example with reference to the drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
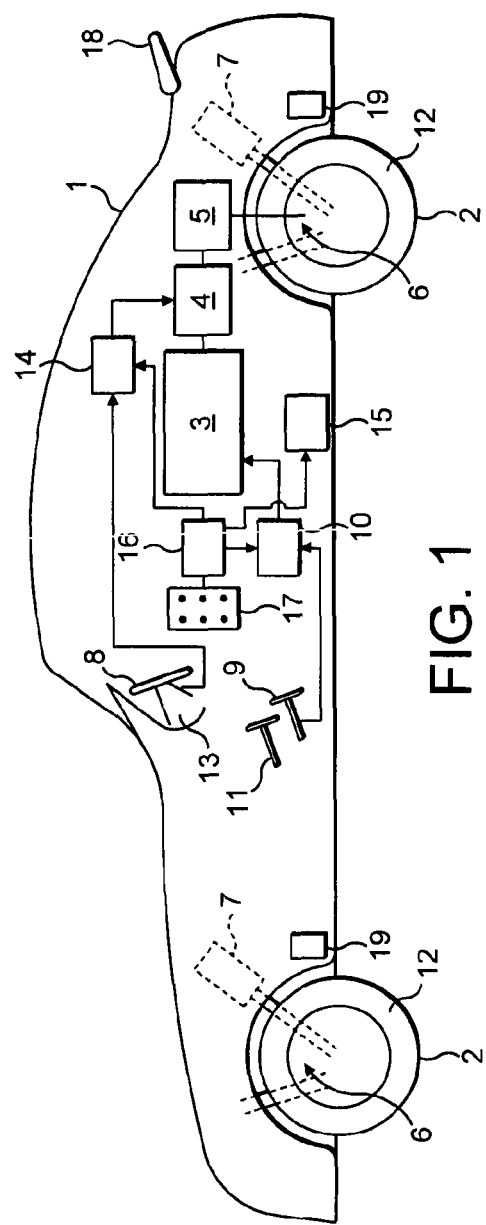
FIG. 1 illustrates a sports car having adjustable dynamic characteristics.

FIG. 1 shows a car having a body 1, wheels 2 and an engine 3. The engine drives the rear wheels through a gearbox 4 and a differential 5. The wheels 2 are mounted to the body via a suspension system 6 having a damper 7 at each wheel.

The driver can steer the front wheels by means of steering wheel 8.

The driver can control the power output by the engine by means of accelerator pedal 9. The position of the accelerator pedal is fed to an electronic engine management unit (EMU) 10. The EMU takes that input and other inputs, processes them by means of code stored in the EMU and forms outputs that control parameters of the engine such as fuel flow rate and ignition timing, thereby setting the engine's output power.

The driver can brake the car by means of brake pedal 11, which actuates brakes 12 at the wheels.

The driver can change gear by means of paddles 13 on the steering wheel. The paddles provide inputs to a gearbox controller (GBC) 14, which processes them by means of code stored in the GBC and forms outputs that control the operation of the gearbox 4.

The vehicle has a stability and traction control system implemented by a stability control unit (SCU) 15. The system monitors the yaw of the vehicle by means of yaw sensor 16 and the rotational speed of the wheels by means of speed sensors 19. In dependence on these inputs it can actuate the brakes and/or command the EMU.

The vehicle has an adjustable aerodynamic element 18, which can be raised or lowered by means of a hydraulic ram. The hydraulic ram could be replaced by another form of drive means. In its lowered position the element provides a low level of downforce and applies a low level of drag. In its raised position the element provides a high level of downforce but applies a high level of drag. The hydraulic ram is electrically controlled.

The car's dynamics can be varied in a number of ways. For example:

1. The way in which the EMU responds to accelerator inputs can be varied so as to make the car more or less sensitive to the accelerator. This is achieved by having the EMU apply a different scaling/mapping to the input that represents the accelerator position.
2. The speed with which the gearbox changes gear can be altered, as can other characteristics of the gear changes. This is achieved by selecting appropriate code to be executed by GBC 14.
3. The suspension's bump and rebound characteristics can be independently altered by adjusting the valving of the dampers 7. The valves are electrically adjustable.
4. The operational mode of the SCU can be altered, so that it intervenes more or less when the vehicle loses stability. This is achieved by selecting appropriate code to be executed by SCU 15.
5. The position of the element 18 can be altered.

The vehicle has a dynamics control unit (DCU) 16. The DCU receives inputs from a dynamics user interface 17, processes those inputs and generates outputs to other components of the vehicle. Those outputs are such as to implement the dynamic settings applied by means of the user interface. In order to generate those outputs the DCU may store and execute code that processes the inputs, and generates the outputs in dependence thereon. Alternatively, (and as for the other devices described herein as operating under software control) the DCU may be implemented in hardware. For example, the inputs to the DCU may indicate that a sensitive accelerator setting should be adopted; and in response to that the DCU would command the EMU to adopt an operating mode in which it responds sensitively to the accelerator.

In summary, the vehicle has a number of sub-systems (engine, suspension, gearbox etc.) that can operate in a number of modes that each affect the car's dynamics differently. Those modes may be embodied by a position or physical setting of the respective sub-system (as in the case of the element 18) or by the adoption of a particular operational strategy by the controller of the respective sub-system (as in the case of an engine management or gearbox control profile). The operating modes of some or all of the sub-systems can be set by the DCU in accordance with the inputs it receives from the driver via its user interface 17.

Figure 2:
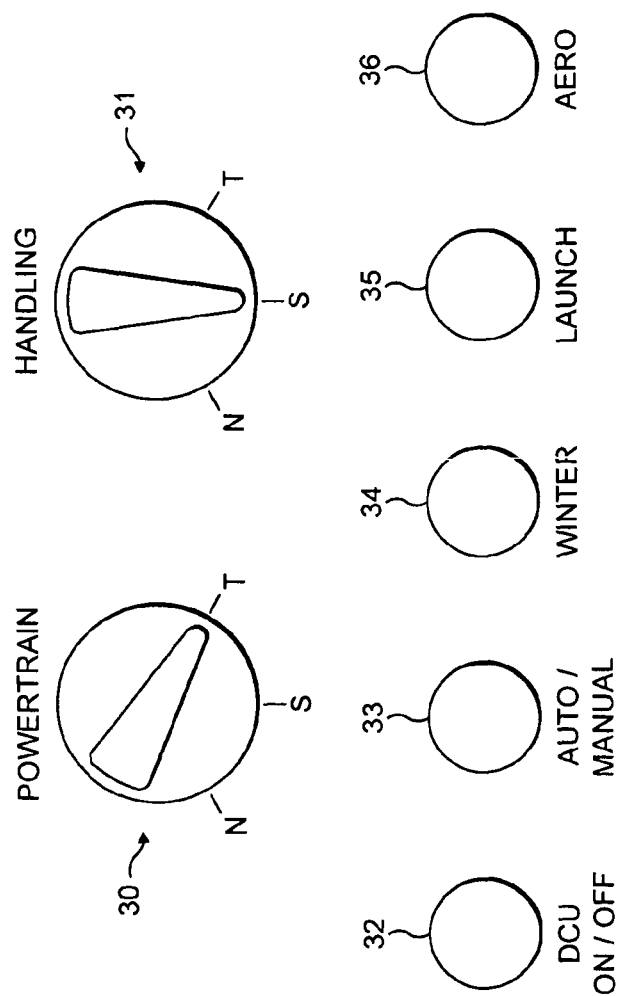
FIG. 2 illustrates a dynamics control panel.

FIG. 2 shows the user interface 17 in more detail.

The user interface comprises two rotary three-position knobs 30, 31 and five push-buttons 32, 33, 34, 35, 36. The function of those inputs will now be described.

Rotary knob 30 is for setting the powertrain characteristics of the car. Rotary knob 30 has three possible settings: "normal", "sport" and "track". "Normal" invokes the least aggressive powertrain characteristics, e.g. least accelerator sensitivity, slowest gear shifts, smoothest gear shifts; "sport" invokes intermediate characteristics and "track" invokes the most aggressive powertrain characteristics, e.g. most accelerator sensitivity, fastest gear shifts.

Rotary knob 31 is for setting the handling characteristics of the car. Rotary knob 31 has three possible settings: "normal", "sport" and "track". "Normal" invokes the least aggressive handling characteristics, e.g. most body roll, no air brake actuation; "sport" invokes intermediate characteristics and "track" invokes the most aggressive handling characteristics, e.g. stiff bump and rebound and air brake enabled.

It has been found that dividing the settings for engine dynamics and handling dynamics between two controls provides a highly ergonomic and functional user interface. It allows the driver to efficiently select dynamic options, because there are essentially only two controls to set. Since those controls can be set independently, numerous combinations of settings are available. It has been found that because these are composed of independent settings for powertrain dynamics and handling dynamics they provide a good range of options for the various conditions that the driver might face. In the example described herein, any of the three powertrain settings can be selected together with any of the three handling settings, giving nine available overall dynamic modes. In a simple example, the driver could select the handling mode to fit with the current road/terrain condition and the powertrain mode to fit with how enthusiastically he intends to drive the car. In more complex examples, the driver could select a firm handling mode and a relaxed engine mode to reduce body roll whilst cruising at high speed; or a moderate handling mode and an aggressive engine mode when on a smooth track that has few tight bends. It can thus be seen that although only two banks of settings are available, the available combinations of those settings, which affect engine dynamics and handling dynamics independently, provide a range of options that suit many operational scenarios, and in an intuitive way. Furthermore, since those settings are available through just two multi-state knobs the system allows the driver to select a desired dynamic mode safely, without having to adjust many separate input devices.

Push-button 32 is for enabling and disabling the DCU. When the push-button is set to "off" the DCU has no effect on the car's dynamics. The position of the knobs 30 and 31 is ignored. When the push-button is set on "on" the DCU sets the dynamic modes of the car's sub-systems in the way described herein. When the car is turned on, the push-button is by default set to "off". This avoids the driver being surprised by the car adopting especially sensitive settings unless he selects them after start-up by positively activating the DCU. At that point the DCU implements the settings according to the current position of knobs 30 and 31.

Push-button 33 is for selecting between automatic and manual gear shift modes. In automatic mode the gearbox shifts gear up and down automatically. In manual mode the driver may make any up or downshifts and/or automatic shifts can be made at the low and high rev limits for additional driver comfort and reduced workload.

Push-button 34 is for enabling and disabling a winter driving mode. When the winter mode is disabled the DCU is responsive to the positions of knobs 30 and 31. When the winter mode is enabled the DCU ignores the positions of knobs 30 and 31 and sets the car's powertrain and handling characteristics to be suitable for winter driving or low traction road conditions.

Push-button 35 is for enabling and disabling launch control. When launch control mode is disabled the car behaves normally. When launch control mode is enabled, the vehicle can make automatic high-acceleration starts and coordinate adjustment of vehicle balance by means of suspension characteristic alterations.

Push-button 36 is for modifying the operation of the air brake 18.

The powertrain and handling factors that the DCU can affect depend on the capabilities of the car, but without limitation they may include:

Powertrain:
  sensitivity to position of accelerator pedal (throttle response map),
  the points at which the gearbox will automatically shift up and down in automatic mode
  torque map
  gearbox shift speed
  gearbox shift smoothness
  settings of valves in exhaust tailpipe
  maximum power
  rev limit
Handling:
  suspension bump and rebound (may be different for front and rear)
  effect of air brake or other adjustable aerodynamic features
  operational mode of stability control system
  operational mode of traction control system
  steering feedback
  brake balance front to rear
  vehicle roll control
  suspension stiffness
  ride height To implement any or all of these the DCU is connected to the appropriate actuator(s) and/or control unit(s) so that it can control them to operate in the appropriate way in dependence on the settings of the user interface 17.

The DCU is configured so as to cause the car to operate in accordance with the driver's settings on the panel 17. One way in which this may be achieved is through a mapping of the available driver settings to the controllable features of the car. The DCU then generates the appropriate outputs in dependence on the settings on the panel. Two examples of such mappings are shown below:

Drivetrain Mappings:

| Drivetrain control setting: | Normal | Sport | Track |
|---|---|---|---|
| Shift speed: | 400 ms | 200 ms | 80 ms |
| Torque map: | Map A | Map B | Map B |
| Tailpipe valves: | Closed | Closed | Open |
| Rev limit: | 7500 rpm | 8000 rpm | 9000 rpm |

Handling Mappings:

| Handling control setting: | Normal | Sport | Track |
|---|---|---|---|
| Suspension damping: | Soft | Medium | Firm |
| Stability control: | On | Limited-yaw | Off |
| Brake balance: | Neutral | Neutral | Biased to front |

The vehicle in which the DCU is installed need not be a sports car. It could be any suitable vehicle: for example a road car, an off-road vehicle or a van.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle having a dynamics control system, the vehicle comprising:
  a first set comprising multiple adjustable sub-systems that affect the performance of the vehicle's powertrain;
  a second set comprising multiple adjustable sub-systems that affect the vehicle's handling;
  a dynamics user interface including a first input device and a second input device; wherein the first input device is a control and the second input device is a control and
  a dynamics controller coupled to the user interface and configured to adjust the operation of the sub-systems of the first set in dependence on the first input device and to adjust the operation of the sub-systems of the second set in dependence on the second input device.

2. A vehicle as claimed in claim 1, wherein the dynamics controller is configured to adjust the operation of the sub-systems of the first set independently of the second input device and to adjust the operation of the sub-systems of the second set independently of the first input device.

3. A vehicle as claimed in claim 1, wherein the first input device has two or more available states, and the dynamics controller is configured to adjust the operation of the sub-systems of the first set in dependence on the state of the first input device.

4. A vehicle as claimed in claim 1, wherein the second input device has two or more available states, and the dynamics controller is configured to adjust the operation of the sub-systems of the second set in dependence on the state of the second input device.

5. A vehicle as claimed in claim 1, wherein the sub-systems of the first set comprise two or more of:
   engine,
   gearbox,
   valving in exhaust.

6. A vehicle as claimed in claim 1, wherein the sub-systems of the second set comprise two or more of:
   suspension,
   variable aerodynamic device,
   stability control system,
   traction control system,
   steering feedback system,
   brake system.

7. A vehicle as claimed in claim 1, wherein
   the dynamics user interface comprises a third input device;
   the dynamics controller is operable in a first mode in which the dynamics controller is configured to adjust the operation of the sub-systems of the first set in dependence on the first input device and to adjust the operation of the sub-systems of the second set in dependence on the second input device, and a second mode in which the dynamics controller is configured to set the operation of the sub-systems of the first set independently of the first input device and to set the operation of the sub-systems of the second set independently of the second input device; the dynamics controller being configured to operate in one of the first and the second modes in dependence on the third input device.

8. A vehicle as claimed in claim 7, comprising a fourth input device to which a gearbox of the car is responsive to switch from manual mode to automatic mode, the gearbox being further configured to operate only in automatic mode, irrespective of the fourth input device, when the dynamics controller is operating in the second mode.

9. A vehicle as claimed in claim 7, comprising a fifth input device to which a variable aerodynamic element of the car is responsive to enable and disable functions of the variable operation of the variable aerodynamic element, the variable aerodynamic element being further configured such that those functions are disabled, irrespective of the fifth input device, when the dynamics controller is operating in the second mode.

10. A vehicle as claimed in claim 7, wherein the dynamics controller is configured to operate by default in the second mode when the vehicle is started.

11. A vehicle as claimed in claim 7, wherein the dynamics controller is configured to, in the second mode, set the sub-systems of the first set and the second set to operating characteristics that are adapted for casual driving.

12. A vehicle as claimed in claim 1, wherein
   the dynamics user interface comprises a sixth input device; and the dynamics controller is operable in a first mode in which the dynamics controller is configured to adjust the operation of the sub-systems of the first set in dependence on the first input device and to adjust the operation of the sub-systems of the second set in dependence on the second input device, and a third mode in which the dynamics controller is configured to set the sub-systems of the first set and the second set to operating characteristics that are adapted for winter driving.

13. A vehicle as claimed in claim 1, wherein the first input device has three or more available states.

14. A vehicle as claimed in claim 1, wherein the second input device has three or more available states.

15. A vehicle as claimed in claim 1, wherein the first input device and the second input device are multi-state knobs.

* * * * *